(12) United States Patent
Kadner et al.

(10) Patent No.: US 7,849,455 B2
(45) Date of Patent: Dec. 7, 2010

(54) SYNCHRONIZATION AND TRANSMISSION OF DISTRIBUTED USER INTERFACES OVER COMPUTER NETWORKS

(75) Inventors: Kay Kadner, Dresden (DE); Christoph Pohl, Dresden (DE)

(73) Assignee: SAP AG, Walldorf (DE)

( * ) Notice: Subject to any disclaimer, the term of this patent is extended or adjusted under 35 U.S.C. 154(b) by 1134 days.

(21) Appl. No.: 11/466,722

(22) Filed: Aug. 23, 2006

(65) Prior Publication Data

US 2008/0126470 A1 May 29, 2008

(51) Int. Cl.
*G06F 9/44* (2006.01)
*G06F 9/45* (2006.01)

(52) U.S. Cl. .................. 717/168; 717/171; 709/203

(58) Field of Classification Search ......... 717/168–175; 715/700; 709/203–204, 223, 227
See application file for complete search history.

(56) References Cited

U.S. PATENT DOCUMENTS

| 5,590,269 | A  | * | 12/1996 | Kruse et al. ............... 705/9 |
| 5,706,281 | A  | * | 1/1998  | Hashimoto et al. ......... 370/252 |
| 6,009,274 | A  | * | 12/1999 | Fletcher et al. ............ 717/173 |
| 6,115,393 | A  | * | 9/2000  | Engel et al. ............... 370/469 |
| 6,665,704 | B1 | * | 12/2003 | Singh ....................... 709/203 |
| 6,687,736 | B1 | * | 2/2004  | Lee .......................... 709/203 |
| 6,826,616 | B2 | * | 11/2004 | Larson et al. .............. 709/228 |
| 6,868,097 | B1 | * | 3/2005  | Soda et al. ................ 370/537 |
| 7,133,896 | B2 | * | 11/2006 | Ogdon et al. .............. 709/205 |
| 7,225,247 | B2 | * | 5/2007  | Kennedy et al. ........... 709/223 |
| 7,231,637 | B1 | * | 6/2007  | McEwan .................... 717/171 |
| 7,280,955 | B2 | * | 10/2007 | Martin ...................... 703/23 |
| 7,447,766 | B2 | * | 11/2008 | Motoyama et al. ......... 709/224 |
| 7,454,489 | B2 | * | 11/2008 | Chauffour et al. .......... 709/223 |
| 7,503,041 | B2 | * | 3/2009  | Butterweck et al. ........ 717/168 |
| 7,555,749 | B2 | * | 6/2009  | Wickham et al. .......... 717/168 |
| 7,739,677 | B1 | * | 6/2010  | Kekre et al. ............... 717/168 |
| 7,747,725 | B2 | * | 6/2010  | Williams et al. ........... 709/223 |

OTHER PUBLICATIONS

Paganini et al, "A unified approach to congestin control and node based multipath routing", IEEE, pp. 1413-1426, 2009.*
Bader et al, "Throughput and delay optimization in interference limited multihop networks", ACM MobiHOc, pp. 274-285, 2006.*

(Continued)

*Primary Examiner*—Anil Khatri
(74) *Attorney, Agent, or Firm*—Fish & Richardson P.C.

(57) ABSTRACT

An initial user interface description is transmitted from a generation component to output modalities which include styling components configured to supplement the initial user interface description with layout information. The output modalities each include rendering components configured to render outputs based upon the initial user interface description and the layout information. Initial user interface description delay times between transmitting the initial user interface description from the generation component and rendering the outputs on the rendering components are determined, and a reference delay time is also determined based upon the greater of the initial user interface description delay times. Correction times are determined based upon the reference delay time and the initial user interface description delay times, and a subsequent user interface description is transmitted from the generation component to the output modalities based upon the correction times, such that the subsequent user interface description is rendered at the rendering components substantially simultaneously.

16 Claims, 9 Drawing Sheets

OTHER PUBLICATIONS

Carloni et al, "Interconnect modeling for improved system level design optimization", IEEE, pp. 258-264, 2008.*

Seo et al, "Delay based reliable data transmission for lossy wireless sensor networks", ACM MoMM, pp. 651-655, 2009.*

'About W3C' [online]. W3C, 2004-2006, [retrieved on Oct. 9, 2006]. Retrieved from the Internet: <URL: www.w3.org/Consortium/activities>, 13 pages.

Yoshimura et al., "Mobile Streaming Media CDN Enabled by Dynamic SMIL," *Proceedings of the 11th International conference on World Wide Web,* Honolulu, Hawaii, 2002, pp. 651-661.

Schmitz, "The SMIL 2.0 Timing and Synchronization model," *Technical Report Microsoft Research MSR TR,* 2001, pp. 1-20.

Soinio, "Viewing Multimedia Messages with 3GPP SMIL in a Size Driven Mobile Terminals," *Master of Science Thesis, Abo Akademi University,* 2004, 72 pages.

Hieda et al, "Design of SMIL Browser Functionality in Mobile Terminals," *Sixth IEEE International Symposium on Object-Oriented Real-Time Distributed Computing,* 2003, 4 pages.

\* cited by examiner

100

SYNCHRONIZATION AND TRANSMISSION OF DISTRIBUTED USER INTERFACES OVER COMPUTER NETWORKS

TECHNICAL FIELD

The present disclosure generally relates to user interfaces, and one particular implementation relates to the simultaneous rendering of multiple user interfaces on separate devices or modalities.

BACKGROUND

User interfaces which enable multimodal access to applications have become increasingly popular in the area of human-computer-interaction. A modality is typically defined as a path of communication between a human and a computer, and where a single device may include one or more modalities.

Multiple input devices which do not individually support multiple modalities may be federated to allow user interaction with multimodal-enabled applications, beyond those levels of interaction offered by a traditional keyboard, mouse, pen or display. Multimodal access initiatives have been developed, for example, by the WORLD WIDE WEB CONSORTIUM® ("W3C®") Multimodal Interaction ("MMI") Activity Working Group. See, e.g., ABOUT W3C: ACTIVITIES.

Although many applications include user interfaces which are designed to be accessed via one particular device, it has also become increasingly popular to design applications which utilize split user interfaces for display on disparate devices. Using split user interfaces, independent modalities are essentially combined for the purpose of accessing a single application, resulting in a user interface which may distributed across many devices. Traditionally, a user interface is split by either dividing the user interface in parts and displaying each part on a device best suited for a desired modality, or by replicating the same user interface on every device.

Using split or replicated user interfaces, significant disadvantages arise if all user interface portions are not simultaneously refreshed in response to a user input. In particular, if the user inputs a command to the application which requires that all distributed user interface portions be synchronously refreshed, the user may suffer from confusion if the disparate modalities do not refresh at the same time.

The MMI Activity Working Group recommends the use of Synchronized Multimedia Integration Language ("SMIL"), which attempts to synchronize multiple output streams by defining 'begin,' 'end,' and 'duration' times for various events. In one brief example, if a video is played using a <VIDEO BEGIN="1s" DUR="5s" . . . /> command, the video starts one second after the relative start time of a parent element. These times are merely relative to other times, although they are initially related to a SMIL presentation start time.

SUMMARY

According to one general implementation, an initial user interface description is transmitted from a generation component to at least first and second output modalities. The first and second output modalities each include first and second styling components, respectively, where the first and second styling components are each configured to supplement the initial user interface description with first and second layout information, respectfully. The first and second output modalities also each include first and second rendering components configured to render first and second outputs based upon the initial user interface description and the first and second layout information, respectively. First and second initial user interface description delay times between transmitting the initial user interface description from the generation component and rendering the first and second outputs on the first and second rendering components, respectively, are determined, and a reference delay time is also determined based upon the greater of the first and second initial user interface description delay times. First and second correction times are determined based upon the reference delay time and the first and second initial user interface description delay times, respectfully, and a subsequent user interface description is transmitted from the generation component to the first and second output modalities based upon the first and second correction times, respectfully, such that the subsequent user interface description is rendered at the first and second rendering components substantially simultaneously.

Additional implementations may include one or more of the following features. For example, each of the first and second initial user interface description delay times may be expressed by Equation (1), below, where $T_{modality}$ represents the initial user interface description delay time, where $T_{processing}$ represents a processing delay, and where $T_{network}$ represents a network delay:

$$T_{modality} = T_{processing} + T_{network} \quad (1)$$

The processing delay may be expressed by Equation (2), below, where $T_{styling}$ represents a styling component processing delay, and where $T_{rendering}$ represents a rendering component processing delay:

$$T_{processing} = T_{styling} + T_{rendering} \quad (2)$$

The network delay may be expressed by Equation (3), below, where $T_{gen-sty}$ represents a generation-styling network transmission delay between the generation component to the styling component, and where $T_{sty-ren}$ represents a styling-rendering network transmission delay between the styling component and the rendering component:

$$T_{network} = T_{gen-sty} + T_{sty-ren} \quad (3)$$

The styling component processing delay may be expressed by Equation (4), below, where style(data) represents an expected styling delay for the subsequent user interface description based upon an actual styling time of the initial user interface description, and where $\epsilon_{styling}$ represents a styling uncertainty delay:

$$T_{styling} = \text{style(data)} + \epsilon_{styling} \quad (4)$$

The rendering component processing delay may be expressed by Equation (5), below, where render(data') represents an expected rendering delay for the subsequent user interface description based upon an actual rendering time of the initial user interface description inflated by an inflation factor α to compensate for augmented layout information, and wherein $\epsilon_{rendering}$ represents a rendering uncertainty delay.

$$T_{rendering} = \text{render(data')} + \epsilon_{rendering} \quad (5)$$

Transmitting the subsequent user interface description may further include inserting the first correction time, transmitting the subsequent user interface description from the generation component to the first output modality based upon the inserted first correction time, inserting the second correction time, and transmitting the subsequent user interface description from the generation component to the second output modality based upon the inserted second correction time. Determining the initial user interface description delay time may further include measuring a delay attribute, and transmitting the delay attribute to the synchronization database, calculating the initial user interface description delay time based upon the delay attribute, and transmitting the initial user interface description delay time to the generation component. The initial user interface description may be transmitted from the generation component to the first or second output modality via a wired or wireless connection. The first and second modalities may be disposed in the same device.

According to another general implementation, a system includes a generation component, at least first and second output modalities, and a synchronization database. The generation component is configured to transmit an initial user interface, and to transmit a subsequent user interface description based upon first and second correction times. The at least first and second output modalities are configured to receive the initial user interface description and the subsequent user interface description. The first and second output modalities each further include a styling component configured to supplement the initial user interface description with layout information, and a rendering component configured to render an output based upon the initial user interface description and the layout information. The synchronization database is configured to determine first and second initial user interface description delay times between transmitting the initial user interface description from the generation component and rendering the first and second outputs on the first and second rendering components, respectively, to determine a reference delay time based upon the greater of the first and second initial user interface description delay times, and to determine the first and second correction times based upon the reference delay time and the first and second initial user interface description delay times, respectfully. The subsequent user interface description is rendered at the first and second rendering components substantially simultaneously.

Additional implementations may include one or more of the following features. For example, the generation component, the first and second output modalities, and/or the synchronization database may be physically disposed in one device. The first and/or second output modalities may be integral to a personal digital assistant, a portable or non-portable computer, and/or a cellular telephone.

According to another general implementation, an initial user interface description is transmitted from a generation component to at least first and second devices. The first and second devices each include first and second styling components, respectively, where the first and second styling components are each configured to supplement the initial user interface description with first and second layout information, respectfully. The first and second devices also each include first and second rendering components configured to render first and second outputs based upon the initial user interface description and the first and second layout information, respectively. First and second initial user interface description delay times between transmitting the initial user interface description from the generation component and rendering the first and second outputs on the first and second rendering components, respectively, are determined, and a reference delay time is also determined based upon the greater of the first and second initial user interface description delay times. First and second correction times are determined based upon the reference delay time and the first and second initial user interface description delay times, respectfully, and a subsequent user interface description is transmitted from the generation component to the first and second devices based upon the first and second correction times, respectfully, such that the subsequent user interface description is rendered at the first and second rendering components substantially simultaneously.

Relative time output synchronization approach is ineffective, for example, if the output is rendered on different devices with different network capabilities since data transmission over heterogeneous networks and devices causes unpredictable delays between the time when the command is issued and the time of the command's execution. As a result, even when using SMIL, heterogeneous networks often exhibit unsynchronized output rendering. To its advantage, the forward synchronization approach for distributed user interfaces described herein requires a low implementation effort, since components merely monitor the load of processors and networks, and since the synchronization is driven by server-side components. Furthermore, no assumption is made about the client's clock synchronization capabilities, and no overhead is required for negotiating time updates among client devices.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers represent corresponding parts throughout.

DETAILED DESCRIPTION

Figure 1:
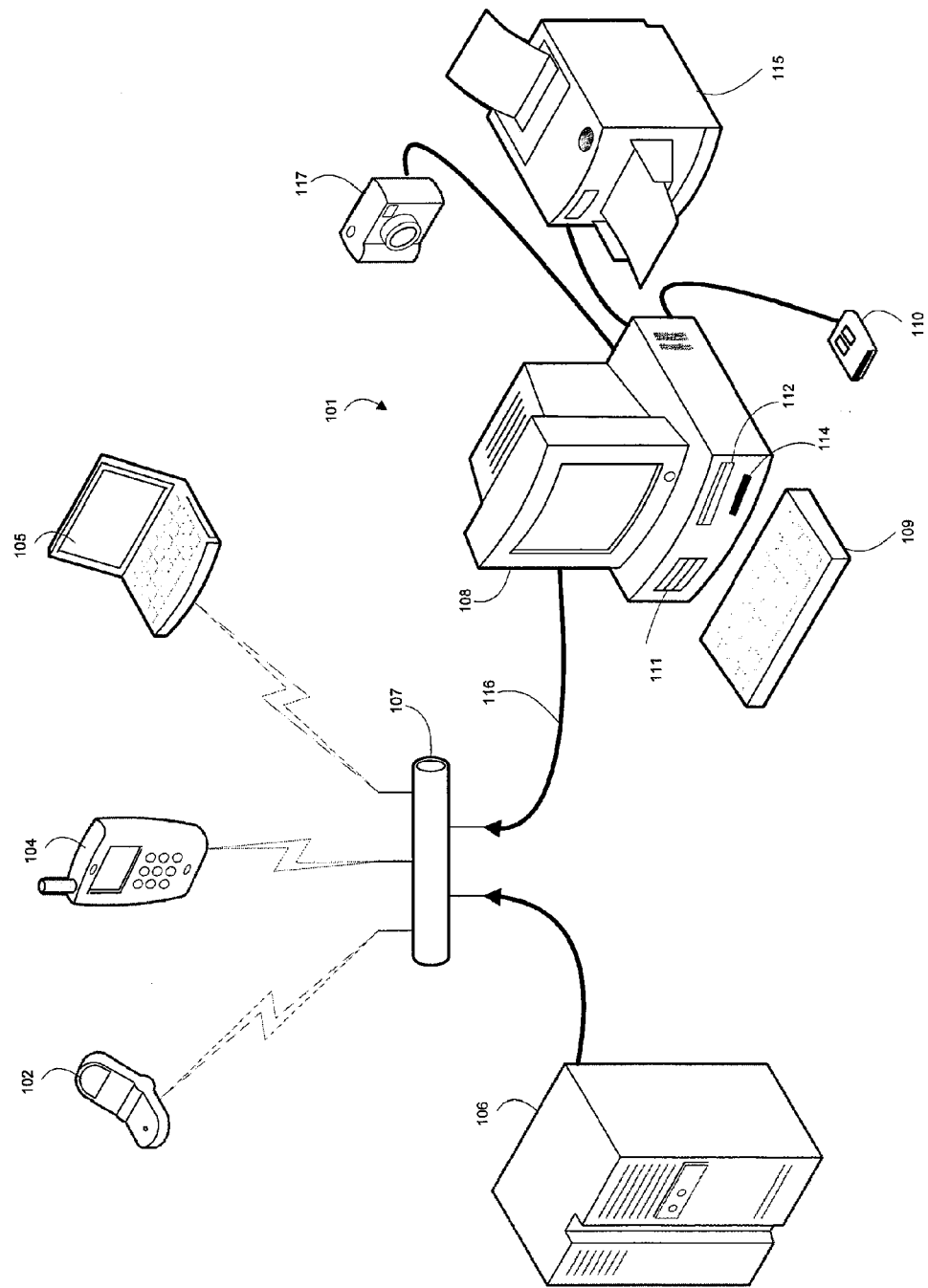
FIG. 1 depicts the exterior appearance of an exemplary system.

FIG. 1 depicts the exterior appearance of an example system 100. Briefly, system 100 includes a generation component (associated with a computer 101), a first output modality 102 (illustrated as a mobile telephone device), a second output modality 104 (illustrated as a personal digital assistant ("PDA")), a third output modality 105 (illustrated as a laptop computer), and a synchronization database (associated with a server 106).

According to one general implementation, and as described in greater detail below, the generation component is configured to transmit an initial user interface, and to transmit a subsequent user interface description based upon first and second correction times. At least the first output modality 102 and the second output modality 104 are configured to receive the initial user interface description and the subsequent user interface description. The first output modality 102 and the second output modality 104 each further include a styling component configured to supplement the initial user interface description with layout information, and a rendering component configured to render an output based upon the initial user interface description and the layout information.

The synchronization database is configured to determine first and second initial user interface description delay times between transmitting the initial user interface description from the generation component and rendering the first and second outputs on the first and second rendering components, respectively, to determine a reference delay time based upon the greater of the first and second initial user interface description delay times, and to determine the first and second correction times based upon the reference delay time and the first and second initial user interface description delay times, respectfully. The subsequent user interface description is rendered at the first and second rendering components substantially simultaneously. By 'substantially simultaneously' it is intended that any difference in time between the rendering of the outputs at the first and second modalities be imperceptible to a human user or operator. In various instances, 'substantially simultaneously' is intended to refer to a lag of within five seconds, within two seconds, within one second, within a tenth of a second, or within a hundredth of a second, or to mean that the outputs be rendered at exactly the same time.

In more detail, the computer 101 is connected to the first output modality 102, the second output modality 104, the third output modality 105, and the server 106, via a network 107. As shown in FIG. 1, the hardware environment of the computer 101 includes a display monitor 108 for displaying text and images to a user, a keyboard 109 for entering text data and user commands into the computer 101, a mouse 110 for pointing, selecting and manipulating objects displayed on the display monitor 108, a fixed disk drive 111, a removable disk drive 112, a tape drive 114, a hardcopy output device 115, a computer network connection 116, and a digital input device 117.

The display monitor 108 displays the graphics, images, and text that comprise the user interface for the software applications used by the system 100, as well as the operating system programs necessary to operate the computer 101. A user uses the keyboard 109 to enter commands and data to operate and control the computer operating system programs as well as the application programs. The user uses the mouse 110 to select and manipulate graphics and text objects displayed on the display monitor 108 as part of the interaction with and control of the computer 101 and applications running on the computer 101. The mouse 110 may be any type of pointing device, and may be a joystick, a trackball, a touch-pad, or other pointing device. Furthermore, the digital input device 117 allows the computer 101 to capture digital images, and may be a scanner, a digital camera, a digital video camera, or other digital input device. Software used to provide for synchronization of distributed user interfaces is stored locally on computer readable memory media, such as the fixed disk drive 111.

In a further implementation, the fixed disk drive 111 itself may include a number of physical drive units, such as a redundant array of independent disks ("RAID"), or may be a disk drive farm or a disk array that is physically located in a separate computing unit. Such computer readable memory media allow the computer 101 to access computer-executable process steps, application programs and the like, stored on removable and non-removable memory media.

The computer network connection 116 may be a modem connection, a local-area network ("LAN") connection including the Ethernet, or a broadband wide-area network ("WAN") connection such as a digital subscriber line ("DSL"), cable high-speed internet connection, dial-up connection, T-1 line, T-3 line, fiber optic connection, or satellite connection. The network 107 may be a LAN network, a corporate or government WAN network, the Internet, or other network. The computer 101 is directly or indirectly coupled to the first output modality 102, the second output modality 104, the third output modality 105, and/or the server 106 via network 107, so as to effectuate unidirectional or bidirectional transmission of data between the computer 101 and the first output modality 102, the second output modality 104, the third output modality 105, and/or the server 106.

The computer network connection 116 may be a wired or wireless connector. Example wireless connectors include, for example, an INFRARED DATA ASSOCIATION® ("IrDA®") wireless connector, an optical wireless connector, an INSTITUTE OF ELECTRICAL AND ELECTRONICS ENGINEERS® ("IEEE®") Standard 802.11 wireless connector, a BLUETOOTH® wireless connector, an orthogonal frequency division multiplexing ("OFDM") ultra wide band ("UWB") wireless connector, a time-modulated ultra wide band ("TM-UWB") wireless connector, or other wireless connector. Example wired connectors include, for example, a IEEE®-1394 FIREWIRE® connector, a Universal Serial Bus ("USB") connector, a serial port connector, a parallel port connector, or other wired connector.

The removable disk drive 112 is a removable storage device that is used to off-load data from the computer 101 or upload data onto the computer 101. The removable disk drive 112 may be a floppy disk drive, an IOMEGA® ZIP® drive, a compact disk-read only memory ("CD-ROM") drive, a CD-Recordable drive ("CD-R"), a CD-Rewritable drive ("CD-RW"), flash memory, a USB flash drive, thumb drive, pen drive, key drive, a High-Density Digital Versatile Disc ("HD-DVD") optical disc drive, a Blu-Ray optical disc drive, a Holographic Digital Data Storage ("HDDS") optical disc drive, or any one of the various recordable or rewritable digital versatile disc ("DVD") drives such as the DVD-Recordable ("DVD-R" or "DVD+R"), DVD-Rewritable ("DVD-RW" or "DVD+RW"), or DVD-RAM. Operating system programs, applications, and various data files, are stored on disks, which are stored on the fixed disk drive 111 or on removable media for the removable disk drive 112.

The tape drive 114 is a tape storage device that is used to off-load data from the computer 101 or to upload data onto the computer 101. The tape drive 114 may be a quarter-inch cartridge ("QIC"), 4 mm digital audio tape ("DAT"), 8 mm digital linear tape ("DLT") drive, or other type of tape.

The hardcopy output device 115 provides an output function for the operating system programs and applications. The hardcopy output device 115 may be a printer or any output device that produces tangible output objects, including textual or image data or graphical representations of textual or image data. While the hardcopy output device 115 is depicted as being directly connected to the computer 101, it need not be. For instance, the hardcopy output device 115 may be connected to computer 101 via a network interface, such as a wired or wireless network.

The server 106 exists remotely on a network, and includes one or more networked data server devices or servers. The server 106 executes software which services requests sent by the computer 101, where the server 106 may include a server farm, a storage farm, or a storage server. In an alternate implementation, the server 106 is omitted, and the functions associated with the server 106 are actually performed by the computer 101.

The first output modality 102, the second output modality 104 and the third output modality 105 may also be omitted, or the functionality associated with each modality may also be implemented by the computer 101 or the server 106. Although the output modalities are illustrated as being integrated with a mobile telephone device, a PDA, and a laptop computer, an output modality may be included or otherwise associated with another type of device capable of rendering a user interface.

Furthermore, although the computer 101 is illustrated in FIG. 1 as a desktop PC, in further implementations the computer 101 may be a laptop, a workstation, a midrange computer, a mainframe, an embedded system, telephone, a handheld or tablet computer, a PDA, or other type of computer.

Although further description of the components which make up the server 106 is omitted for the sake of brevity, it suffices to say that the hardware environment of the computer or individual networked computers which make up the server 106 is similar to that of the exemplary hardware environment described herein with regard to the computer 101. In an alternate implementation, the functions of the computer 101 and the server 106 are combined in a single, combined hardware environment.

Figure 2:
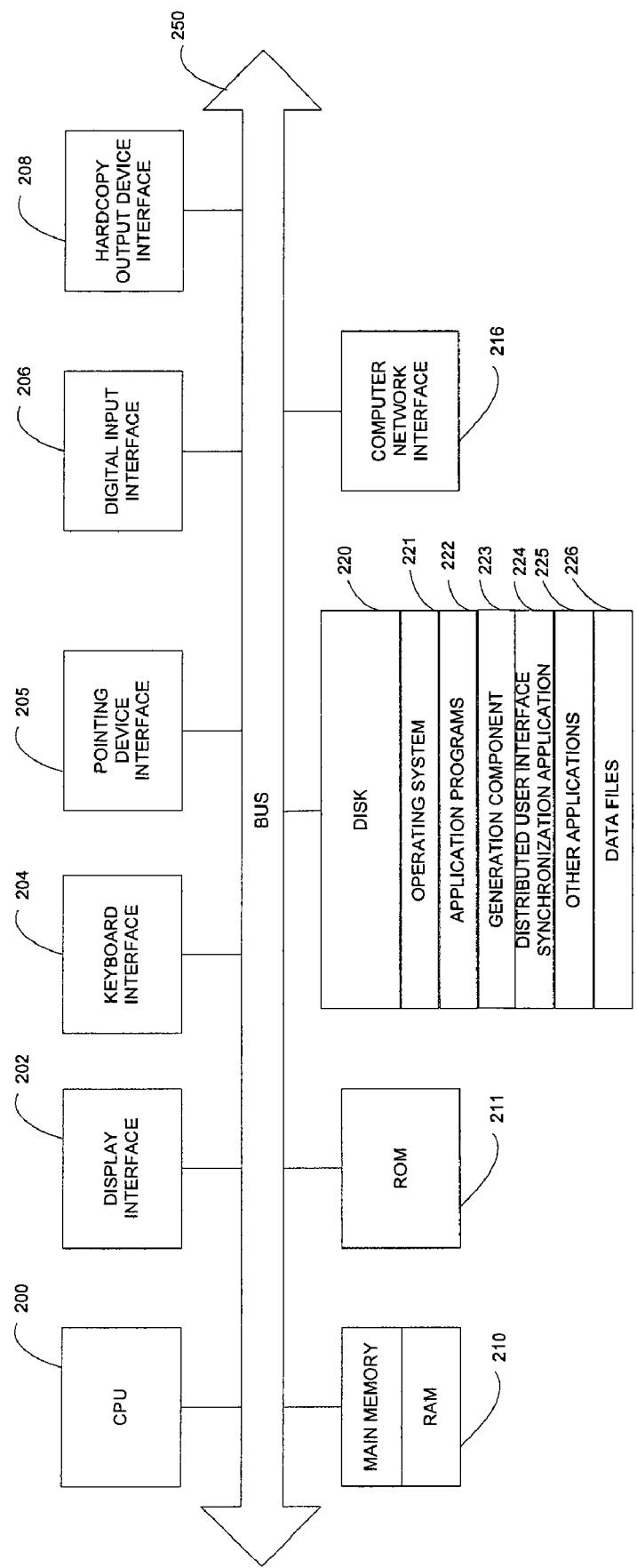
FIG. 2 depicts an example of an internal architecture of the computer of FIG. 1.

FIG. 2 depicts an example of an internal architecture of the computer 101. The computing environment includes a computer central processing unit ("CPU") 200 where the computer instructions that comprise an operating system or an application are processed; a display interface 202 which provides a communication interface and processing functions for rendering graphics, images, and texts on the display monitor 108; a keyboard interface 204 which provides a communication interface to the keyboard 109; a pointing device interface 205 which provides a communication interface to the mouse 110 or an equivalent pointing device; a digital input interface 206 which provides a communication interface to the digital input device 117; a hardcopy output device interface 208 which provides a communication interface to the hardcopy output device 115; a random access memory ("RAM") 210 where computer instructions and data are stored in a volatile memory device for processing by the computer CPU 200; a read-only memory ("ROM") 211 where invariant low-level systems code or data for basic system functions such as basic input and output ("I/O"), startup, or reception of keystrokes from the keyboard 109 are stored in a non-volatile memory device; and optionally a storage 220 or other suitable type of memory (e.g. such as random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives), where the files that comprise an operating system 221, application programs 222 (including generation component 223, distributed user interface synchronization application 224, and other applications 225 as necessary) and data files 226 are stored; a computer network interface 216 which provides a communication interface to the network 107 over the computer network connection 116. The constituent devices and the computer CPU 200 communicate with each other over the computer bus 250.

Although application programs 222 is illustrated as including generation component 223, it may also include, or the generation component 223 may be substituted with, a styling component and/or a rendering component. Accordingly, one software component may explicitly or implicitly invoke a single role or multiple roles.

The RAM 210 interfaces with the computer bus 250 so as to provide quick RAM storage to the computer CPU 200 during the execution of software programs such as the operating system application programs, and device drivers. More specifically, the computer CPU 200 loads computer-executable process steps from the fixed disk drive 111 or other memory media into a field of the RAM 210 in order to execute software programs. Data is stored in the RAM 210, where the data is accessed by the computer CPU 200 during execution.

Also shown in FIG. 2, the computer 101 stores computer-executable code for a operating system 221, application programs 222 such as word processing, spreadsheet, presentation, gaming, or other applications. Although it is possible to provide synchronization of distributed user interfaces using the above-described implementation, it is also possible to implement the functions according to the present disclosure as a dynamic link library ("DLL"), or as a plug-in to other application programs such as an Internet web-browser such as the MICROSOFT® Internet Explorer web browser.

The computer CPU 200 is one of a number of high-performance computer processors, including an INTEL® or AMD® processor, a POWERPC® processor, a MIPS® reduced instruction set computer ("RISC") processor, a SPARC® processor, an ACORN® RISC Machine ("ARM®") architecture processor, a HP ALPHASERVER® processor or a proprietary computer processor for a mainframe. In an additional arrangement, the computer CPU 200 is more than one processing unit, including a multiple CPU configuration found in high-performance workstations and servers, or a multiple scalable processing unit found in mainframes.

The operating system 221 may be MICROSOFT® WINDOWS NT®/WINDOWS® 2000/WINDOWS® XP Workstation; WINDOWS NT®/WINDOWS® 2000/WINDOWS® XP Server; a variety of UNIX®-flavored operating systems, including AIX® for IBM® workstations and servers, SUNOS® for SUN® workstations and servers, LINUX® for INTEL® CPU-based workstations and servers, HP UX WORKLOAD MANAGER® for HP® workstations and servers, IRIX® for SGI® workstations and servers, VAX/VMS for Digital Equipment Corporation computers, OPENVMS® for HP ALPHASERVER®-based computers, MAC OS® X for POWERPC® based workstations and servers; SYMBIAN OS®, WINDOWS MOBILE® or WINDOWS CE®, PALM®, NOKIA® OS ("NOS"), OSE®, or EPOC® for mobile devices, or a proprietary operating system for computers or embedded systems. The application development platform or framework for the operating system 221 may be: BINARY RUNTIME ENVIRONMENT FOR WIRELESS® ("BREW®"); Java Platform, Micro Edition ("Java ME") or Java 2 Platform, Micro Edition ("J2ME®"); PYTHON™, FLASH LITE®, or MICROSOFT®.NET Compact.

Although further description of the internal architecture of the server 106 is omitted for the sake of brevity, it suffices to say that the architecture is similar to that of the computer 101. In an alternate implementation, where the functions of the computer 101 and the server 106 are combined in a single, combined hardware environment, the internal architecture is combined or duplicated. In addition to a generation component, the server 106 may include a styling component, a rendering component, or other components.

While FIGS. 1 and 2 illustrate one possible implementation of a computing system that executes program code, or program or process steps, configured to effectuate synchronization of distributed user interfaces, other types of computers may also be used as well.

Figure 3:
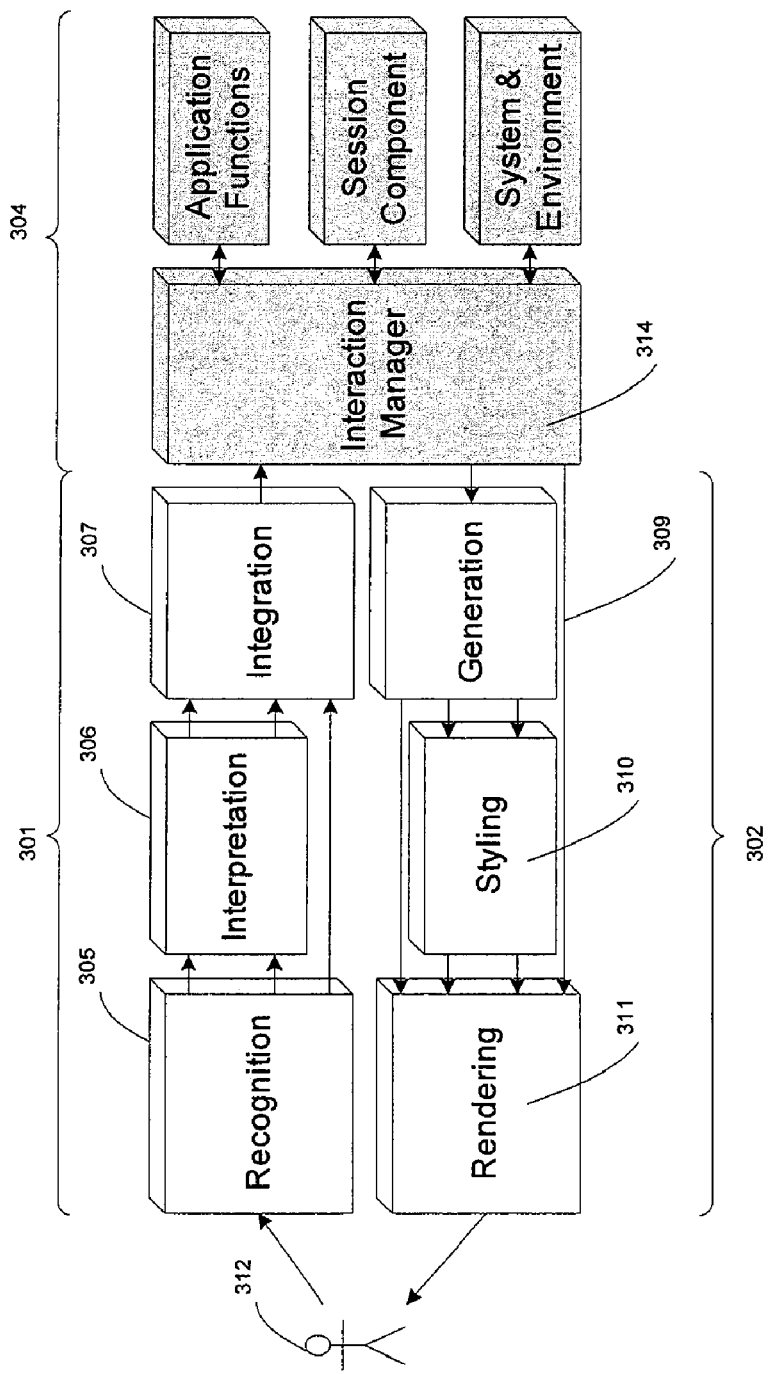
FIG. 3 is a block diagram illustrating an example system architecture for implementing synchronous multimodal interaction.

FIG. 3 is a block diagram illustrating an example system architecture 300 used for implementing synchronous multimodal interaction, in which roles are specified for supporting multimodality. According to one implementation, the system architecture is loosely based upon the MultiModal Interaction Framework ("MMI-F") developed by the W3C® MMI Activity Working Group. In particular, system architecture 300 distinguishes between input processing role 301, output processing role 302, and application functionality 304.

With regard to the input processing role 301, the recognition role 305 acts as the actual user interface for recognizing input, the interpretation role 306 semantically transforms input to concrete commands, and the integration role 307 fuses those commands for enabling composite multimodal input. With regard to the output processing role 302, the generation role 309 receives the result of queries, generates a user interface description, and passes the user description to the styling role 310. The styling role 310 receives the user interface description for a selected modality, and adds layout information, before passing the user interface description and layout information to the rendering role 311, which acts as the actual user interface for rendering output. Between the input processing role 301 and output processing role are the user 312, which interprets the rendered output from rendering role 310 and inputs commands into recognition role 301, and the interaction manager 314, which queries the application and generates query results.

The MMI-F does not require that roles must be structured in a particular, concrete architecture, only that they live at various points of the network, including the local client. Accordingly, each role is realized by a separate component distributed within a network, or combined in unified components, as desired. For example, using the FIG. 1 architecture, all of the MMI-F components may be executed on one device, such as where the generation component, styling component and rendering component are all executed by the computer 101. Alternatively, MMI-F components may be distributed among several devices, such as where the generation component is executed by the computer 101, and each of devices 102, 104 and 105 include separate styling components and rendering components.

Figure 4:
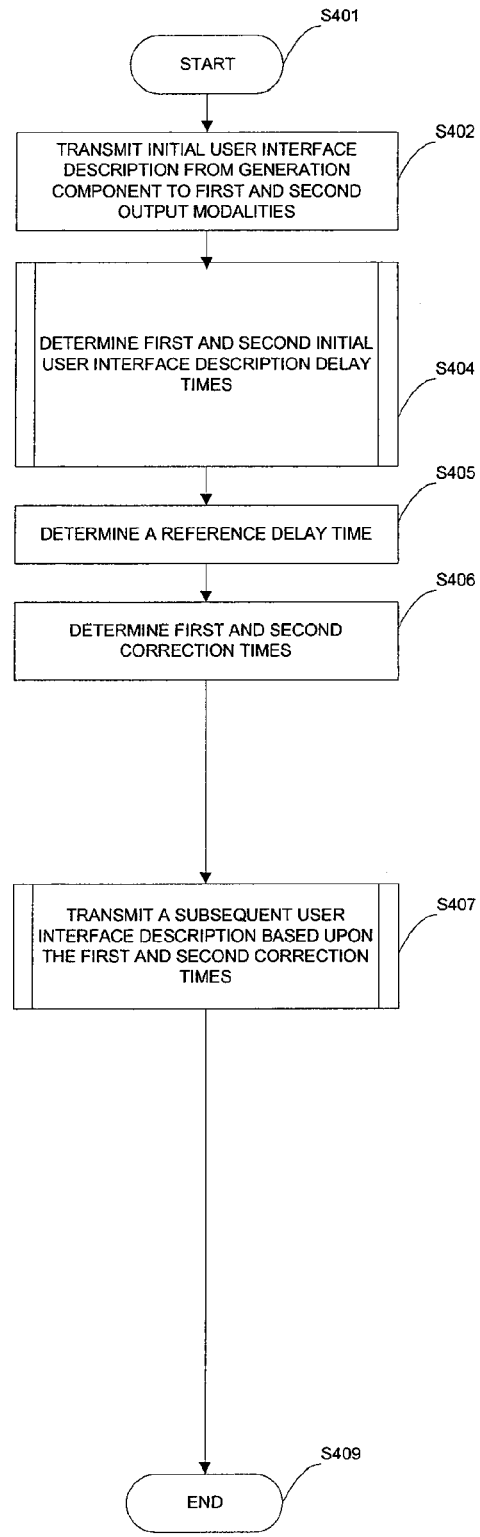
FIG. 4 is a flow chart illustrating an exemplary method.

FIG. 4 is a flowchart illustrating an exemplary method 400. Briefly, an initial user interface description is transmitted from a generation component to at least first and second output modalities. The first and second output modalities each include first and second styling components, respectively, where the first and second styling components are each configured to supplement the initial user interface description with first and second layout information, respectfully. The first and second output modalities also each include first and second rendering components configured to render first and second outputs based upon the initial user interface description and the first and second layout information, respectively. First and second initial user interface description delay times between transmitting the initial user interface description from the generation component and rendering the first and second outputs on the first and second rendering components, respectively, are determined, and a reference delay time is also determined based upon the greater of the first and second initial user interface description delay times. First and second correction times are determined based upon the reference delay time and the first and second initial user interface description delay times, respectfully, and a subsequent user interface description is transmitted from the generation component to the first and second output modalities based upon the first and second correction times, respectfully, such that the subsequent user interface description is rendered at the first and second rendering components substantially simultaneously.

In more detail, method 400 begins (S401), and an initial user interface description is transmitted from a generation component to at least first and second output modalities (S402). The first and second output modalities each include first and second styling components, respectively, where the first and second styling components are each configured to supplement the initial user interface description with first and second layout information, respectfully. The first and second output modalities also include first and second rendering components configured to render first and second outputs based upon the initial user interface description and the first and second layout information, respectively. According to one implementation, the initial user interface description is transmitted from the generation component to the first or second output modality, via a wired or wireless connection.

First and second initial user interface description delay times between transmitting the initial user interface description from the generation component and rendering the first and second outputs on the first and second rendering components, respectively, are determined (S404).

Figure 5:
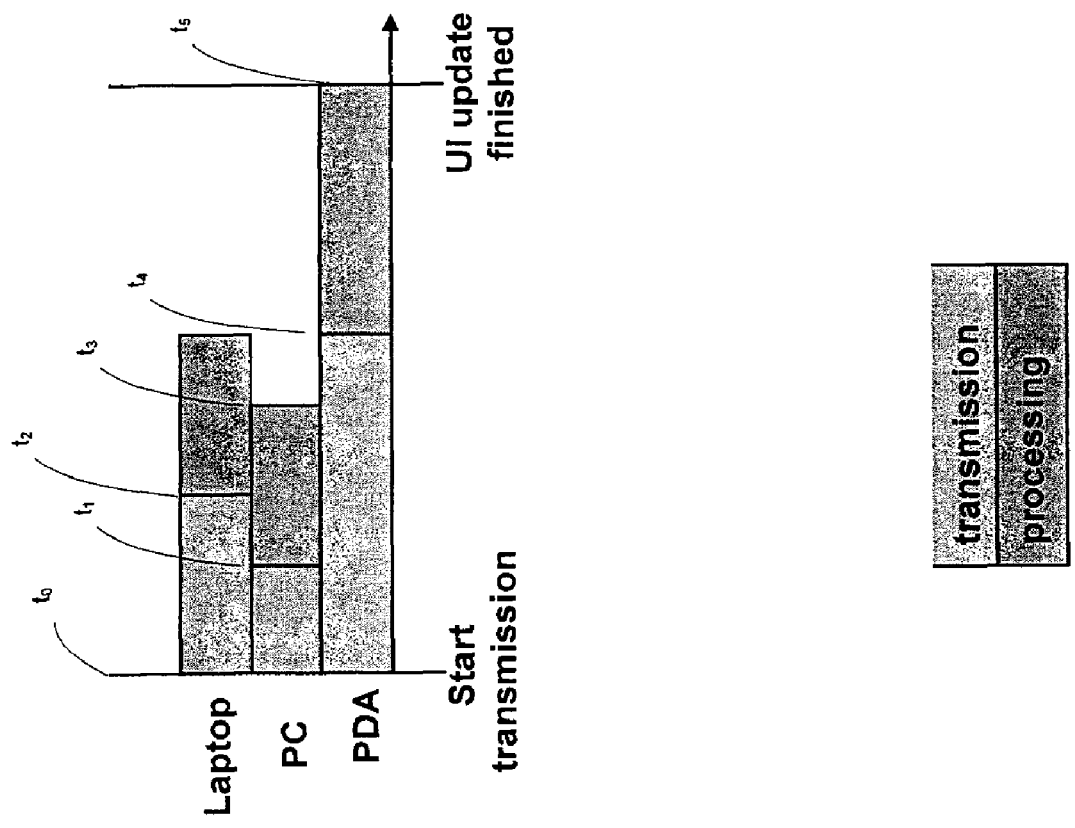
FIG. 5 is a chart illustrating the timing of an unsynchronized user interface update.

Various approaches are available for determining the user interface description delay times. For example, FIG. 5 is chart illustrating the timing of an unsynchronized user interface update, which occurs as a result of transmitting the initial user interface description from a generation component to a first through third output modalities, which are a laptop computer, a personal computer, and a PDA, respectively. In this example, the personal computer and the laptop computer have approximately the same processing power, however the laptop computer has a slower network connection, such as where the personal computer is connected to the network via a wired Ethernet connection and the laptop computer is connected to the network via a WiFi connection. The PDA has a processing capability that is far slower than the laptop computer and the personal computer, and also has a network connection which is slower than the network connection of the laptop computer.

In this example, the generation component transmits the initial user interface description to the first output modality (the laptop computer), the second output modality (the personal computer), and the third output modality (the PDA) at substantially the same time (time $t_0$). Since the personal computer has the fastest network connection and the PDA has the slowest network connection, the initial user interface description is received by the styling component of the personal computer at time $t_1$, is received by the styling component of the laptop computer at time $t_2$, and is received at styling component of the PDA at time $t_4$.

Once received, each respective styling component supplements the initial user interface description with layout information, and the rendering component renders an output based upon the initial user interface description and the layout information supplemented by the respective styling component. The styling and rendering components of the personal computer process the initial user interface description between time $t_1$ and time $t_3$, the styling and rendering components of the laptop computer process the initial user interface description between time $t_2$ and time $t_4$, and the styling and rendering components of the PDA process the initial user interface description between time $t_4$ and $t_5$.

In this regard, the reference delay time for the personal computer is $(t_3-t_0)$, the reference delay time for the laptop computer is $(t_4-t_0)$, and the reference delay time for the PDA is $(t_5-t_0)$. Notably, since outputs were rendered on each of the output modalities at times $t_3$, $t_4$ and $t_5$, an asynchronous update results, which could potentially confuse or distract a user.

Figure 6:
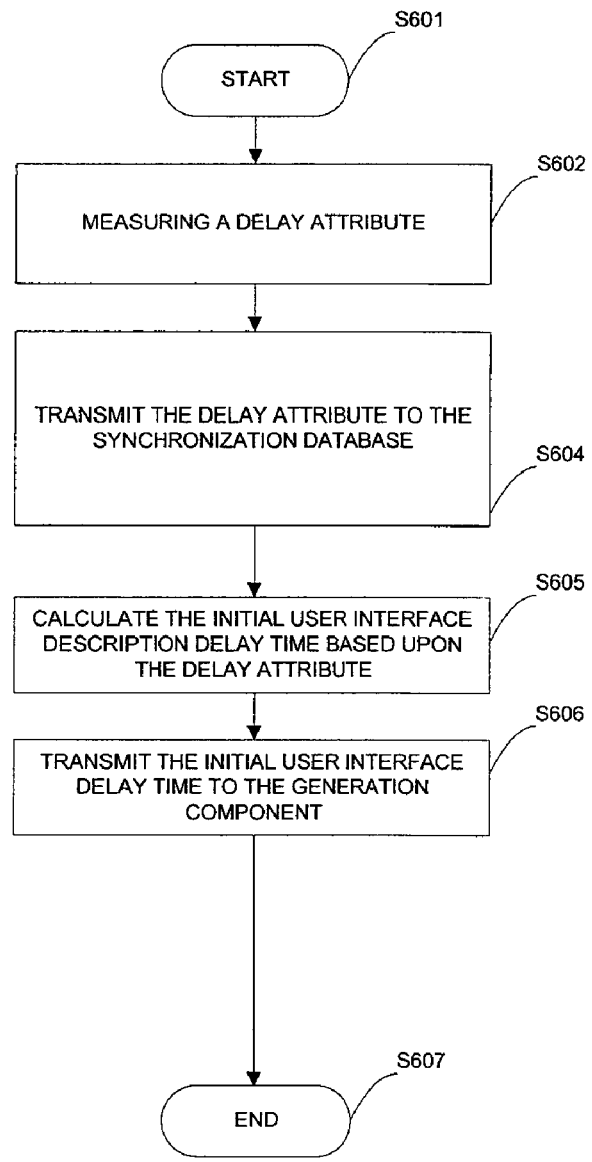
FIG. 6 is a flowchart illustrating an exemplary method for determining the initial user interface description delay time.

FIG. 6 is a flowchart illustrating an exemplary method 600 for determining the initial user interface description delay time. When method 600 begin (S601), a delay attribute is measured (S602), and the delay attribute is transmitted to the synchronization database (S604). The initial user interface description delay time is calculated at the synchronization database based upon the delay attribute (S605), the initial user interface description delay time is transmitted to the generation component (S606), and method 600 ends. In another implementation, the synchronization database is a passive storage repository for delay attributes, where the actual calculation is performed by the generation component based upon the values stored in the synchronization database by the styling and rendering components. In this instance, the initial user interface delay time is not transmitted to the generation component, rather the delay attributes are received at the generation component, which then calculates the initial user interface description delay time.

Figure 7:
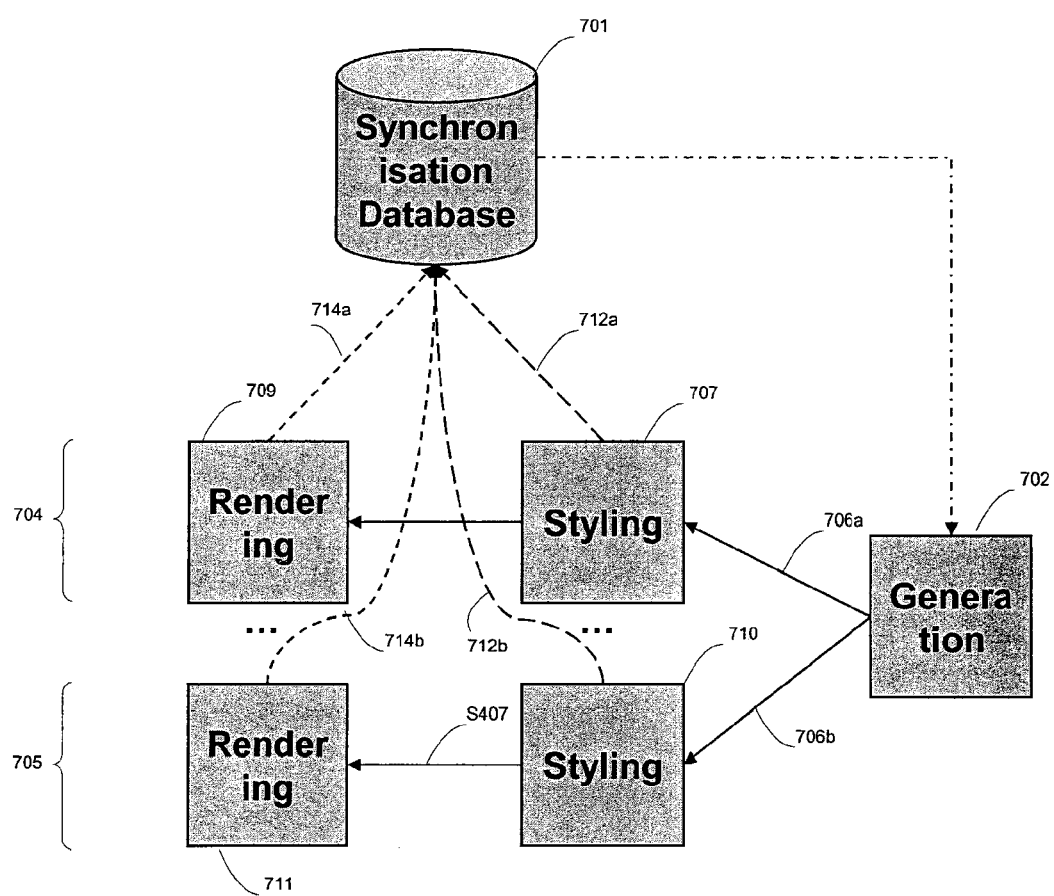
FIG. 7 is a block diagram illustrating an exemplary architecture for implementing the method of FIG. 6.

Similarly, FIG. 7 is a block diagram illustrating an exemplary architecture for implementing method 600. Briefly, a synchronization database 701, is used to store individual delay attributes received from individual components of the output processing role. A generation component 702 retrieves the delay attributes, and calculates the appropriate user interface description delay time.

In more detail, the generation component 702 transmits an initial user interface description to output modality 704 and output modality 705 via transmissions 706a and 706b, respectively. The transmissions 706a and 706b may or may not be identical, depending upon the underlying technology.

Output modality 704 includes styling component 707 and rendering component 709, and output modality 705 includes styling component 710 and rendering component 711. Styling component 707 measures or calculates a delay attribute for output modality 704, such as a styling component transmission delay attribute and/or a styling component processing delay attribute, and transmits the delay attribute to synchronization database 701 via styling delay attribute transmission 712a.

Styling component 708 transmits a similarly calculated or measured delay attribute associated with output modality 705 via delay attribute transmission 712b. Rendering component 709 also measures or calculates a delay attribute for output modality 705, such as a rendering component transmission delay attribute, a rendering component processing delay attribute, and transmits the delay attribute to synchronization database 701 via rendering delay attribute transmission 714a. Rendering component 711 transmits a similarly calculated or measured delay attribute associated with output modality 705 via delay attribute transmission 714b.

The synchronization database is thus updated by each of the four components, on a regular basis. The rate at which the components update the synchronization database is dependent upon system design and usage, and may be every few milliseconds, every second, every five seconds, or once per minute, hour, day, or other time interval. For instance, if the particular component utilizes a slow General Packet Radio Service ("GPRS") connection, a less frequent update would be appropriate. Alternatively, the rate could be user-defined, or could be triggered by the activation of a component or a data transmission. If no user interface description is transferred from the generation component to the rendering component, the synchronization database is not updated, and no delay times or correction times can be measured or calculated.

The user interface description delay times are influenced by several factors, which can be generally divided into two categories: network (or transmission) delays and processing delay. Network delay refers to delays caused by the transmission of information over networks, and processing delay refer to the time which a component uses to processing data. Since disparate processing resources and network connection types may be utilized, the total delay is thus the sum of the network delays and the processing delays.

According to another general implementation, each of the first and second initial user interface description delay times is expressed by Equation (1), below, where $T_{modality}$ represents the initial user interface description delay time, where $T_{processing}$ represents a processing delay, and where $T_{network}$ represents a network delay:

$$T_{modality} = T_{processing} + T_{network} \quad (1)$$

In Equation (1), the processing delay includes the time elapsed for styling and rendering, and the network delay includes the time elapsed for transmitting the user interface description from the generation component to the styling component, and transmitting the user interface description supplemented with layout information from the styling component to the rendering component.

Accordingly, the processing delay may be expressed by Equation (2), below, where $T_{styling}$ represents a styling component processing delay, and where $T_{rendering}$ represents a rendering component processing delay:

$$T_{processing} = T_{styling} + T_{rendering} \quad (2)$$

The network delay may be expressed by Equation (3), below, where $T_{gen\text{-}sty}$ represents a generation-styling network transmission delay between the generation component to the styling component, and where $T_{sty\text{-}ren}$ represents a styling-rendering network transmission delay between the styling component and the rendering component:

$$T_{network} = T_{gen\text{-}sty} + T_{sty\text{-}ren} \quad (3)$$

Because the styling component supplements the user interface description with layout information, $T_{sty\text{-}ren}$ includes the time required to transmit the user interface description and the layout information from the styling component to the rendering component.

In order to determine the expected processing delay, $T_{processing}$, the styling and rendering components each monitor the load of the respective output modalities. Based upon this load indicator and knowledge about the internal processes of the respective component, the expected time for a certain amount of data can be measured. Since the actual processing time may not depend solely on the data amount, but also the data structure, the type of data should also be taken into account, where an uncertainty factor $\epsilon$, representing an unexpected load, may be factored into such a measurement.

The styling component processing delay may be expressed by Equation (4), below, where style(data) represents an expected styling delay for the subsequent user interface description based upon an actual styling time of the initial user interface description, and where $\epsilon_{styling}$ represents a styling uncertainty delay:

$$T_{styling} = \text{style(data)} + \epsilon_{styling} \quad (4)$$

The rendering component processing delay may be expressed by Equation (5), below, where render(data') represents an expected rendering delay for the subsequent user interface description based upon an actual rendering time of the initial user interface description inflated by an inflation factor $\alpha$ to compensate for augmented layout information, and wherein $\epsilon_{rendering}$ represents a rendering uncertainty delay.

$$T_{rendering} = \text{render(data')} + \epsilon_{rendering} \quad (5)$$

The uncertainty factor $\epsilon$ may be affected by the current workload of a component's host, since there will normally be more than one process running on each computer. If many processes are executing which demand a high CPU load or memory consumption, such as memory swapping processes, the uncertainty factor $\epsilon$ may need to be increased to make an accurate prediction of processing delay.

Additionally, the uncertainty factor $\epsilon$ may also be affected by the structure of the data being processed. If the initial user interface description, for example, includes 10 image references per 5 kilobytes, the processing of each reference takes a certain amount of time. If the subsequent user interface description includes 50 image references in 3 kilobytes, the processing of the user description will take longer than can be predicted merely by the size. In another example, 5 kilobytes of pure text may be faster to process than 5 kilobytes of tables or other structured information. In each of these cases, the uncertainty factor $\epsilon$ may be adjusted to reflect the change in structure or composition of the data. Furthermore, the uncertainty factor $\epsilon$ may also be affected by dependencies to other components. For example, the uncertainty factor $\epsilon$ may change if components are disposed on the same host instead of distributed amongst different hosts, since the processing of information might require access to additional, remotely-located processing data.

Since the styling component adds layout information to the received data, the styling component and the rendering component each process a different amount of data. The exact amount of data processed by the rendering component is thus not easily predicted. One approach for addressing this disparity is to heuristically define inflation factor $\alpha$, which is used to estimate data', using Equation (6), below:

$$\text{data}' = \alpha * \text{data} \tag{6}$$

The inflation factor $\alpha$ heavily depends on the transformation which occurs at the styling component, and therefore the particular modality for which the user interface description is being styled. Since the data input to each styling component is the same, the output size of data' depends primarily upon on the modality associated with the styling component, where inflation factor $\alpha$ may not be the same for each modality. Since the generation component may also send user interface descriptions that are already tailored for each respective modality, the inflation factor $\alpha$ may also be different for each user interface description received.

In one example, a plain or unstyled user interface description may be transformed into both VoiceXML for voice interaction and XHTML for visual interaction. For the voice-based modality, all information regarding visual output, such as links, tables, or colors, will be removed, and vocal styling information will be added, such as to increase the voice volume of bold fonts, or to change the voice associated with a spoken headline. If the voice-based modality is intended to be used as complementary modality instead of the primary modality, the contained information could be substantially reduced, resulting in an inflation factor $\alpha$ of less than 1. Consequentially, since the the visual interaction-based modality is the primary modality, the XHTML data should contain all necessary information, styled in a robust manner, resulting in an inflation factor $\alpha$ of greater than 1.

The network delay may also depend upon the particular network technology or communication protocol used. For example, if a user interface description is transmitted using the Transmission Control Protocol ("TCP"), a connection delay is incurred prior to data transmission, while the User Datagram Protocol ("UDP") incurs no such connection delay. Accordingly, network delay may be a factor of both network latency and data transmission speed. Since an expected network delay is protocol dependent, latency can be measured using an Internet Control Message Protocol ("ICMP") ping command, or a similar technique, and data transmission speed can be measured via dummy data transfers, or measuring prior substantive data transfers.

Under the MMI-F, network delay is determined for the transmission between the generation component and the styling component, and for the transmission between the styling component and the rendering component (if the two components are discrete components). In one instance, the generation component measures the network delay between the generation component and the styling component, and the styling component measures the network delay between the styling component and the rendering component, although other arrangements are also possible. In another instance, the generation component does not store the network delay in the synchronization database, since it is both a contributor and a consumer of the data.

In any case, the component which is measuring or calculating the network delay regularly updates the synchronization database with the measured or calculated values. It is helpful to abstract the network delay between each respective component to the expression shown in Equation (7), below, where speed refers to the data transmission speed, latency refers to the network latency, and data refers to the quantity of data being transferred:

$$T_{network} = \text{transfer}(\text{speed}, \text{latency}, \text{data}) \tag{7}$$

After inserting Equations (2) to (7) into Equation (1), the delay for a particular device is expressed as shown in Equation (8), below:

$$T_{modality} = \text{style}(\text{data}) + \text{render}(\alpha * \text{data}) + \text{transfer}_1(\text{speed}_1, \text{latency}_1, \text{data}_1) + \text{transfer}_2(\text{speed}_2, \text{latency}_2, \alpha * \text{data}_1) + \epsilon_{styling} + \epsilon_{rendering} \tag{8}$$

If components are merged, such as where one component assumes the roles of both the styling component and the rendering component, Equation (8) can be further simplified. Merged components will also reduce the overall network delay, although overall processing time may increase since the rendering devices may not be as powerful as infrastructure servers, due to characteristics inherent to client devices.

A reference delay time is also determined based upon the greater of the first and second initial user interface description delay times (S405). After the generation component has determined $T_{modality}$ for each output modality participating in the distributed user interface, the highest delay of output modalities ($T^{max}_{modality}$) is set as the reference delay time. The highest delay determines the earliest point in time in which the user interface can be synchronously updated.

First and second correction times are determined based upon the reference delay time and the first and second initial user interface description delay times, respectfully (S406). In particular, the generation component calculates the delay (Delay$_{modality}$) for each output modality, which is inserted in each device prior to transmitting each subsequent user interface description to the respective styling component. The delay is expressed below in Equation (9):

$$\text{Delay}_{modality} = T^{max}_{modality} - T_{modality} \tag{9}$$

A subsequent user interface description is transmitted from the generation component to the first and second output modalities based upon the first and second correction times, respectfully, such that the subsequent user interface description is rendered at the first and second rendering components substantially simultaneously (S407), and method 400 ends (S409). In particular, the generation component schedules the delivery of a user interface description for each output modality, or each remaining output modality. In this regard, the user interface description for the device with the highest delay is transmitted earliest, perhaps immediately. The user interface descriptions for any remaining output modality are transmitted after the calculated delay time has passed.

Figure 8:
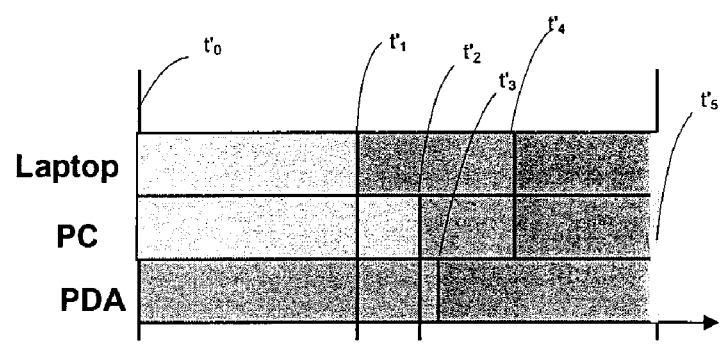
FIG. 8 is a chart illustrating the timing of a synchronized user interface update.
Figure 8:
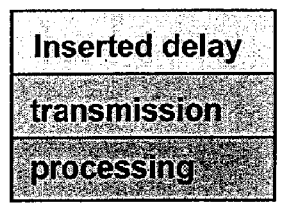

FIG. 8 is chart illustrating the timing of a synchronized user interface update using the instant forward synchronization approach. In this example, as in FIG. 5, the personal computer and the laptop computer have approximately the same processing power, however the laptop computer has a slower network connection. The PDA has a processing capability that is far slower than the laptop computer and the personal computer, and also has a network connection which is slower than the network connection of the laptop computer.

Since the PDA has the highest correction time, calculated delays are inserted for the laptop computer and the personal computer. At time $t'_0$, the user interface description is transmitted from the generation component to the PDA. In different implementations, time $t'_0$ may be immediately following calculation of the correction time for the laptop computer or personal computer, or time $t'_0$ may represent some time afterwards, in the case where all three output modalities receive an inserted correction time.

Since the laptop computer had a higher user interface description delay time than the personal computer, the generation component transmits the user interface description to the laptop computer at time $t'_1$. Referring briefly to FIG. 5, the period between time $t'_0$ and $t'_1$ is substantially the same as the delay between time $t_4$ and time $t_5$.

The generation component then transmits the user interface description to the personal computer at time $t'_2$. The period between time $t'_0$ and time $t'_2$ is substantially the same as the delay between time $t_3$ and time $t_5$, in FIG. 5. Since the PDA experiences an extended network delay, the user interface description is received by the styling component associated with that device at time $t'_3$, and is received at the styling components associated with the laptop computer and personal computer at time $t'_4$. As shown in FIG. 8, an output is rendered by each output modality substantially simultaneously, at time $t'_5$. Using to the calculated correction times, the generation component schedules the user interface description delivery for the remaining devices, where the user interface description for the device with the highest correction time is sent out immediately, and the remaining user interface descriptions are sent out after the respective calculated correction time has passed.

Figure 9:
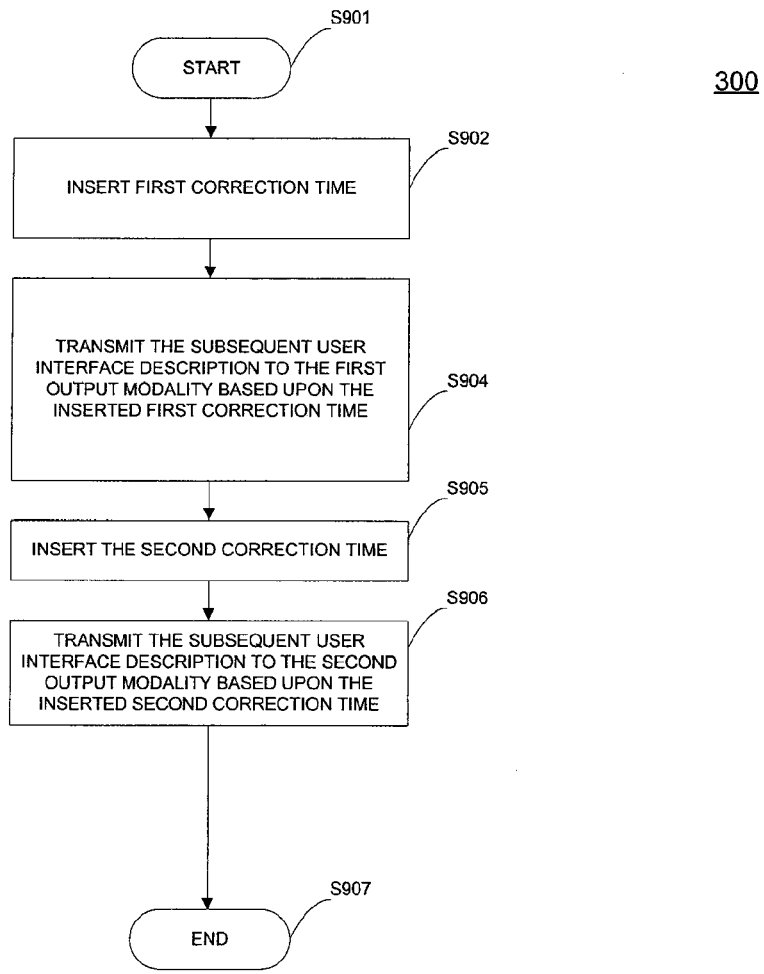
FIG. 9 is a flowchart illustrating an exemplary method for transmitting the subsequent user interface description.

According to another general implementation, and as illustrated in FIG. 9, method 900 for transmitting the subsequent user interface description begins (S901), the first correction time is inserted (S902), and the subsequent user interface description is transmitted from the generation component to the first output modality based upon the inserted first correction time (S904). Moreover, the second correction time is inserted (S905), the subsequent user interface description is transmitted from the generation component to the second output modality based upon the inserted second correction time (S906), and method 900 ends (S907).

To its advantage, the forward synchronization approach for distributed user interfaces described herein requires a low implementation effort, since components merely monitor the load of processors and networks, and since the synchronization is driven by server-side components. Furthermore, no assumption is made about the client's clock synchronization capabilities, and no overhead is required for negotiating time updates among client devices.

Furthermore, since the synchronization approach relates to the rendering of multiple user interface on multiple devices, the approach is not merely limited to multimodal applications. For example, it is also possible to synchronize same-modality user interfaces on multiple devices, or multiple modalities on the same device, using this synchronization approach.

For example, and according to another general implementation, an initial user interface description is transmitted from a generation component to at least first and second devices. The first and second devices each include first and second styling components, respectively, where the first and second styling components are each configured to supplement the initial user interface description with first and second layout information, respectfully. The first and second devices also each include first and second rendering components configured to render first and second outputs based upon the initial user interface description and the first and second layout information, respectively. First and second initial user interface description delay times between transmitting the initial user interface description from the generation component and rendering the first and second outputs on the first and second rendering components, respectively, are determined, and a reference delay time is also determined based upon the greater of the first and second initial user interface description delay times. First and second correction times are determined based upon the reference delay time and the first and second initial user interface description delay times, respectfully, and a subsequent user interface description is transmitted from the generation component to the first and second devices based upon the first and second correction times, respectfully, such that the subsequent user interface description is rendered at the first and second rendering components substantially simultaneously. The first and second outputs may be rendered via the same modality The enhanced forward synchronization of distributed user interfaces approach has been described above using examples which assume that the multimodal architecture is configured such that each role of the MMI-F is played by an individual hardware or software component. Furthermore, the generation component has been described as being located on a separate computer which transmits the user interface description to the respective styling and rendering components via a network, such that individual portions of the user interface would be updated at different times if no synchronization were to occur, because of the different network and processing capabilities of the output modalities. Such examples have been used for the sake of brevity, and other implementations which do not make these same assumptions are also contemplated. For instance, in an alternate implementation, several or all roles of the MMI-F may be combined into a single structure or further subdivided. In any case, the principle of selectively delaying a subsequent user interface description transmission based upon measuring a prior, initial user interface description, as described herein, remains applicable.

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:
   transmitting an initial user interface description from a generation computing device to at least first and second output modalities, the initial user interface description corresponding to a distributed user interface, the first and second output modalities each including first and second styling components, respectively, the first and second styling components each configured to supplement the initial user interface description with first and second layout information, respectively, and first and second rendering components each configured to render the distributed user interface based upon the initial user interface description and the first and second layout information, respectively;

determining first and second initial user interface description delay times between transmitting the initial user interface description from the generation computing device and rendering the distributed user interface on each of the first and second rendering components, respectively;

determining a reference delay time based upon the greater of the first and second initial user interface description delay times;

determining first and second correction times based upon the reference delay time and the first and second initial user interface description delay times, respectively; and transmitting a subsequent user interface description from the generation computing device to the first and second output modalities based upon the first and second correction times, respectively, such that the distributed user interface is updated at each of the first and second rendering components based on the subsequent user interface description substantially simultaneously; wherein determining the initial user interface description delay time further comprises: measuring a delay attribute; and transmitting the delay attribute to the synchronization database; calculating the initial user interface description delay time based upon the delay attribute; and transmitting the initial user interface description delay time to the generation computing device.

2. The method of claim 1, wherein each of the first and second initial user interface description delay times is expressed as:

$$T_{modality} = T_{processing} + T_{network},$$

wherein $T_{modality}$ represents the initial user interface description delay time, wherein $T_{processing}$ represents a processing delay, and wherein $T_{network}$ represents a network delay.

3. The method of claim 2, wherein the processing delay is expressed as:

$$T_{processing} = T_{styling} + T_{rendering},$$

wherein $T_{styling}$ represents a styling component processing delay, and wherein $T_{rendering}$ represents a rendering component processing delay.

4. The method of claim 3, wherein the styling component processing delay is expressed as:

$$T_{styling} = \text{style}(data) + \epsilon_{styling},$$

wherein style (data) represents an expected styling delay for the subsequent user interface description based upon an actual styling time of the initial user interface description, and wherein $\epsilon_{styling}$ represents a styling uncertainty delay.

5. The method of claim 3, wherein the rendering component processing delay is expressed as:

$$T_{rendering} = \text{render}(data') + \epsilon_{rendering},$$

wherein render(data') represents an expected rendering delay for the subsequent user interface description based upon an actual rendering time of the initial user interface description inflated by an inflation factor $\alpha$ to compensate for augmented layout information, and wherein $\epsilon_{rendering}$ represents a rendering uncertainty delay.

6. The method of claim 2, wherein the network delay is expressed as:

$$T_{network} = T_{gen\text{-}sty} + T_{sty\text{-}ren},$$

wherein $T_{gen\text{-}sty}$ represents a generation-styling network transmission delay between the generation component to the styling component, and wherein $T_{sty\text{-}ren}$ represents a styling-rendering network transmission delay between the styling component and the rendering component.

7. The method of claim 1, wherein transmitting the subsequent user interface description further comprises:

inserting the first correction time;

transmitting the subsequent user interface description from the generation computing device to the first output modality based upon the inserted first correction time;

inserting the second correction time; and transmitting the subsequent user interface description from the generation computing device to the second output modality based upon the inserted second correction time.

8. The method of claim 1, wherein the initial user interface description is transmitted from the generation computing device to the first or second output modality via a wired or wireless connection.

9. The method of claim 1, wherein the first and second modalities are disposed in the same device.

10. The method of claim 1, wherein the first and second output modalities are provided as first and second devices, respectively.

11. A system comprising:

a generation computing device configured to transmit an initial user interface description, and to transmit a subsequent user interface description based upon first and second correction times, the initial user interface description corresponding to a distributed user interface;

at least first and second output modalities configured to receive the initial user interface description and the subsequent user interface description, the first and second output modalities each further comprising:

a styling component configured to supplement the initial user interface description with layout information, and a rendering component configured to render the distributed user interface based upon the initial user interface description and the layout information; and a synchronization database configured to determine first and second initial user interface description delay times between transmitting the initial user interface description from the generation computing device and rendering the distributed user interface on each of the first and second rendering components, respectively, to determine a reference delay time based upon the greater of the first and second initial user interface description delay times, and to determine the first and second correction times based upon the reference delay time and the first and second initial user interface description delay times, respectively, wherein the distributed user interface is updated at each of the first and second rendering components based on the subsequent user interface description substantially simultaneously; wherein determining the initial user interface description delay time further comprises: measuring a delay attribute; and transmitting the delay attribute to the synchronization database; calculating the initial user interface description delay time based upon the delay attribute; and transmitting the initial user interface description delay time to the generation computing device.

12. The system of claim 11, wherein the generation computing device, the first and second output modalities, and/or the synchronization database are physically disposed in one device.

13. The system of claim 11, wherein the first and/or second output modalities are integral to a personal digital assistant, a portable or non-portable computer, and/or a cellular telephone.

14. The system of claim 11, wherein the first and second output modalities are provided as first and second devices, respectively.

15. A method comprising:

transmitting an initial user interface description from a generation computing device to at least first and second devices, the initial user interface description corresponding to a distributed user interface, the first and second devices each including first and second styling components, respectively, the first and second styling components each configured to supplement the initial user interface description with first and second layout information, respectively, and first and second rendering components configured to render the distributed user interface based upon the initial user interface description and the first and second layout information, respectively;

determining first and second initial user interface description delay times between transmitting the initial user interface description from the generation computing device and rendering the distributed user interface on each of the first and second rendering components, respectively;

determining a reference delay time based upon the greater of the first and second initial user interface description delay times;

determining first and second correction times based upon the reference delay time and the first and second initial user interface description delay times, respectively; and transmitting a subsequent user interface description from the generation computing device to the first and second devices based upon the first and second correction times, respectively, such that the distributed user interface is updated at each of the first and second rendering components based on the subsequent user interface description substantially simultaneously; wherein determining the initial user interface description delay time further comprises: measuring a delay attribute; and transmitting the delay attribute to the synchronization database; calculating the initial user interface description delay time based upon the delay attribute; and transmitting the initial user interface description delay time to the generation computing device.

16. The method according to claim 15, wherein the first and second outputs are rendered via the same modality.

* * * * *